(12) United States Patent
Oh (10) Patent No.: US 12,370,965 B2
(45) Date of Patent: Jul. 29, 2025

(54) VEHICLE AND CONTROL METHOD THEREOF

(71) Applicants: Hyundai Motor Company, Seoul (KR); Kia Corporation, Seoul (KR)

(72) Inventor: Yonghwi Oh, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 393 days.

(21) Appl. No.: 17/952,631

(22) Filed: Sep. 26, 2022

(65) Prior Publication Data
US 2023/0202412 A1 Jun. 29, 2023

(30) Foreign Application Priority Data

Dec. 29, 2021 (KR) .......... 10-2021-0190924

(51) Int. Cl.
*B60R 16/037* (2006.01)
*B60N 2/00* (2006.01)
*B60N 2/02* (2006.01)
*B60N 2/56* (2006.01)

(52) U.S. Cl.
CPC .......... *B60R 16/037* (2013.01); *B60N 2/0024* (2023.08); *B60N 2/0035* (2023.08); *B60N 2/0248* (2013.01); *B60N 2/5678* (2013.01); *B60N 2210/20* (2023.08); *B60N 2210/48* (2023.08); *B60N 2230/20* (2023.08)

(58) Field of Classification Search
None
See application file for complete search history.

(56) References Cited

U.S. PATENT DOCUMENTS

| | | | | |
|---|---|---|---|---|
| 10,469,589 | B2* | 11/2019 | Mueller | H04L 67/12 |
| 10,723,241 | B2* | 7/2020 | Yamamoto | G08B 21/22 |
| 11,628,786 | B2* | 4/2023 | Mezaael | B60H 1/00964 |
| | | | | 701/2 |
| 2010/0305816 | A1* | 12/2010 | Orlewski | B60R 21/01526 |
| | | | | 701/45 |
| 2019/0239043 | A1* | 8/2019 | Palin | H04L 67/53 |

* cited by examiner

*Primary Examiner* — James J Lee
*Assistant Examiner* — David Hatch
(74) *Attorney, Agent, or Firm* — Fox Rothschild LLP

(57) ABSTRACT

A vehicle comprising a plurality of seats, a plurality of Bluetooth® modules to which Bluetooth® identification information, different from each other, is assigned, configured to perform pairing with a plurality of user terminals, wherein each of the plurality of Bluetooth® modules corresponds to each of the plurality of seats, a memory configured to store terminal identification information assigned to each of the plurality of user terminals and the Bluetooth® identification information assigned to each of the plurality of Bluetooth® modules, and a processor configured to be connected to the plurality of Bluetooth® modules and the memory.

18 Claims, 8 Drawing Sheets

VEHICLE AND CONTROL METHOD THEREOF

CROSS-REFERENCE TO RELATED APPLICATION(S)

This application claims, under 35 U.S.C. § 119 (a), the benefit of Korean Patent Application No. 10-2021-0190924, filed on Dec. 29, 2021 in the Korean Intellectual Property Office, the disclosure of which is incorporated herein by reference in its entirety.

BACKGROUND

Technical Field

Embodiments of the present disclosure relate to a vehicle and a control method thereof, and more specifically, to a vehicle equipped with a Bluetooth® transceiver system and a control method thereof.

Description of the Related Art

A vehicle may be equipped with a vehicle pairing technology configured to provide a variety of services by linking to communication devices such as a smartphone. As for pairing technologies, Bluetooth® communication is mainly used, and a vehicle may be wirelessly connected to a driver's terminal or an occupant's terminal via Bluetooth® communication to provide various services.

A driver may be a main user, in a connection between a vehicle and a terminal via Bluetooth® communication, and the vehicle may be controlled through a driver's terminal as a center. To this end, a vehicle may be capable of executing a command only through a driver's terminal by registering a driver's profile for Bluetooth® pairing.

Due to the recent development of autonomous driving, however, a vehicle is no longer a means for driver only, and thus there is a need for a vehicle to be controlled by every occupant in the vehicle.

SUMMARY

An aspect of the disclosure provides a vehicle and a control method thereof that may provide customized functions to every occupant in the vehicle.

Additional aspects of the disclosure will be set forth in part in the description which follows and, in part, will be obvious from the description, or may be learned by practice of the disclosure.

According to an exemplary embodiment of the disclosure, there is provided a vehicle, comprising: a plurality of seats; a plurality of Bluetooth® modules to which Bluetooth® identification information different from each other is assigned, configured to perform pairing with a plurality of user terminals, each of the plurality of Bluetooth® modules corresponding to each of the plurality of seats; a memory configured to store terminal identification information assigned to each of the plurality of user terminals and the Bluetooth® identification information assigned to each of the plurality of Bluetooth® modules; and a processor configured to be connected to the plurality of Bluetooth® modules and the memory, wherein, when pairing is completed between one of the plurality of Bluetooth® modules and one of the plurality of user terminals, the processor may be configured to determine a seat position of a paired user terminal based on the Bluetooth® identification information, and generate a control command according to setting information stored in the paired user terminal.

A first Bluetooth® module which is the one of the plurality of Bluetooth® modules may be configured to receive a plurality of Bluetooth® signals from the plurality of user terminals, and the processor may be configured to control the first Bluetooth® module to pair with a user terminal with a highest strength of a Bluetooth® signal among the plurality of user terminals.

The processor may be configured to identify the seat position of the user terminal based on a strength of the Bluetooth® signal.

The plurality of user terminals are configured to receive a setting input for at least one of a memory seat, a seat heating wire, a ventilated seat, an air conditioner or a window, and the processor may be configured to control the memory to store the setting input for each terminal identification information.

The processor may be configured to determine the seat position of the paired user terminal, and control the memory seat located in the determined seat position according to the setting input.

The processor may be configured to determine the seat position of the paired user terminal, and control a temperature of the seat heating wire located in the determined seat position according to the setting input.

The processor may be configured to determine the seat position of the paired user terminal, and control a temperature of the air conditioner located around the determined seat position according to the setting input.

According to an exemplary embodiment, the vehicle further comprises a door sensor configured to detect a closing of a door of the vehicle and generate a door signal, and wherein the processor may be configured to determine the seat position of the paired user terminal based on the door signal.

According to an exemplary embodiment, the vehicle further comprises a seat sensor provided in each of the plurality of seats and configured to detect a pressure by a driver or an occupant and generate a seat signal according to the pressure, wherein the processor may be configured to determine the seat position of the paired user terminal based on the seat signal.

According to an exemplary embodiment, the vehicle further comprises a rear occupant alert (ROA) system configured to detect an occupant located in a rear seat and generate a rear seat signal according to a presence of the occupant located in the rear seat, wherein the processor may be configured to determine the seat position of the paired user terminal based on the rear seat signal.

The processor may be configured to detect a change in Bluetooth® signal strength detected by one of the plurality of Bluetooth® modules, and determine a movement of the seat position of the paired user terminal.

The processor may be configured to detect a change of the seat signal and determine a movement of the seat position of the paired user terminal.

The processor may be configured to detect a change of the rear seat signal and determine a movement of the seat position of the paired user terminal.

According to an exemplary embodiment of the disclosure, there is provided a control method of a vehicle comprising a plurality of Bluetooth® modules configured to perform pairing with a plurality of user terminals, the control method comprising: performing pairing between one of the plurality of Bluetooth® modules and one of the plurality of user terminals; determining a seat position of a paired user terminal based on Bluetooth® identification information; and generating a control command according to setting information stored in the paired user terminal.

The performing pairing comprises controlling one of the plurality of Bluetooth® modules to pair with a user terminal with a highest strength of a Bluetooth® signal among the plurality of user terminals.

According to an exemplary embodiment, the control method further comprises identifying a seat position of the user terminal based on a strength of the Bluetooth® signal.

According to an exemplary embodiment, the control method further comprises: receiving a setting input for at least one of a memory seat, a seat heating wire, a ventilated seat, an air conditioner or a window, through the plurality of user terminals; and controlling a memory to store the setting input for each terminal identification information.

According to an exemplary embodiment, the control method further comprises determining the seat position of the paired user terminal, and controlling the memory seat located in the determined seat position according to the setting input.

According to an exemplary embodiment, the control method further comprises determining the seat position of the paired user terminal, and controlling a temperature of the seat heating wire located in the determined seat position according to the setting input.

According to an exemplary embodiment, the control method further comprises determining the seat position of the paired user terminal, and controlling a temperature of the air conditioner located around the determined seat position according to the setting input.

According to an exemplary embodiment, the vehicle further comprises a door sensor configured to detect a closing of a door of the vehicle and generate a door signal, and the control method further comprises determining the seat position of the paired user terminal based on the door signal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may comprise a plurality of elements.

It will be understood that when an element is referred to as being "connected" to another element, it can be directly or indirectly connected to the other element, wherein the indirect connection includes connection via a wireless communication network.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

Figure 1:
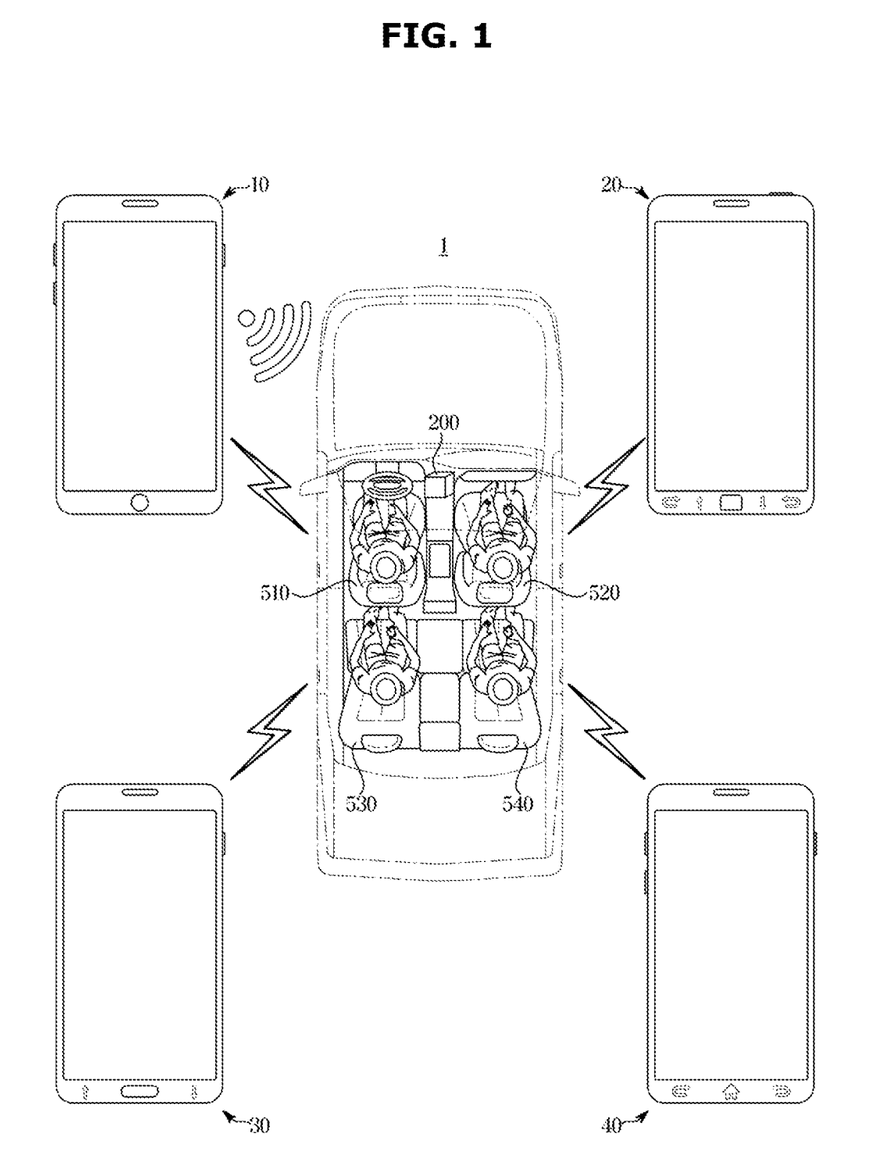
FIGS. 1 and 2 illustrate a connection relationship among user terminals and Bluetooth® modules in a vehicle according to an exemplary embodiment.
Figure 2:
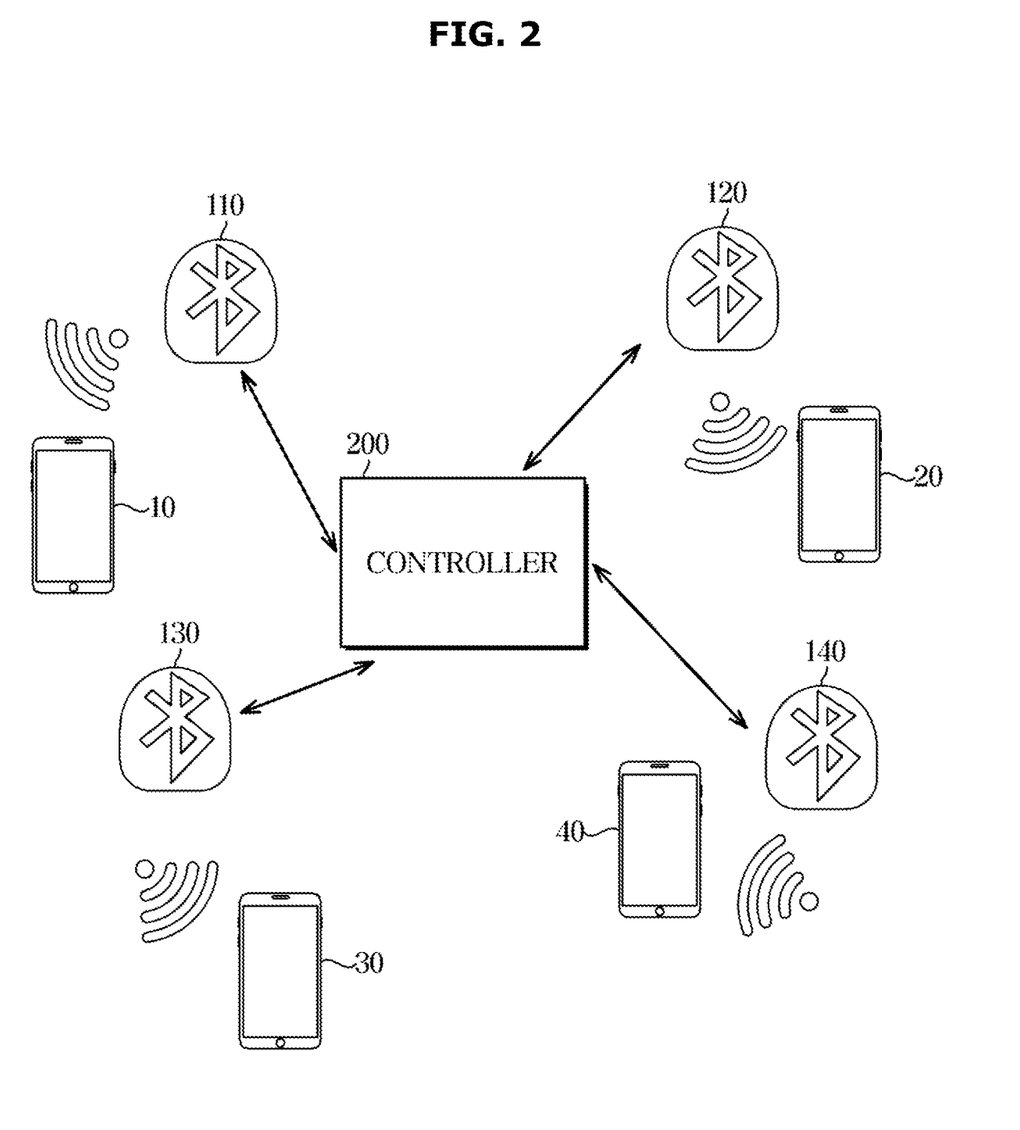
Figure 3:
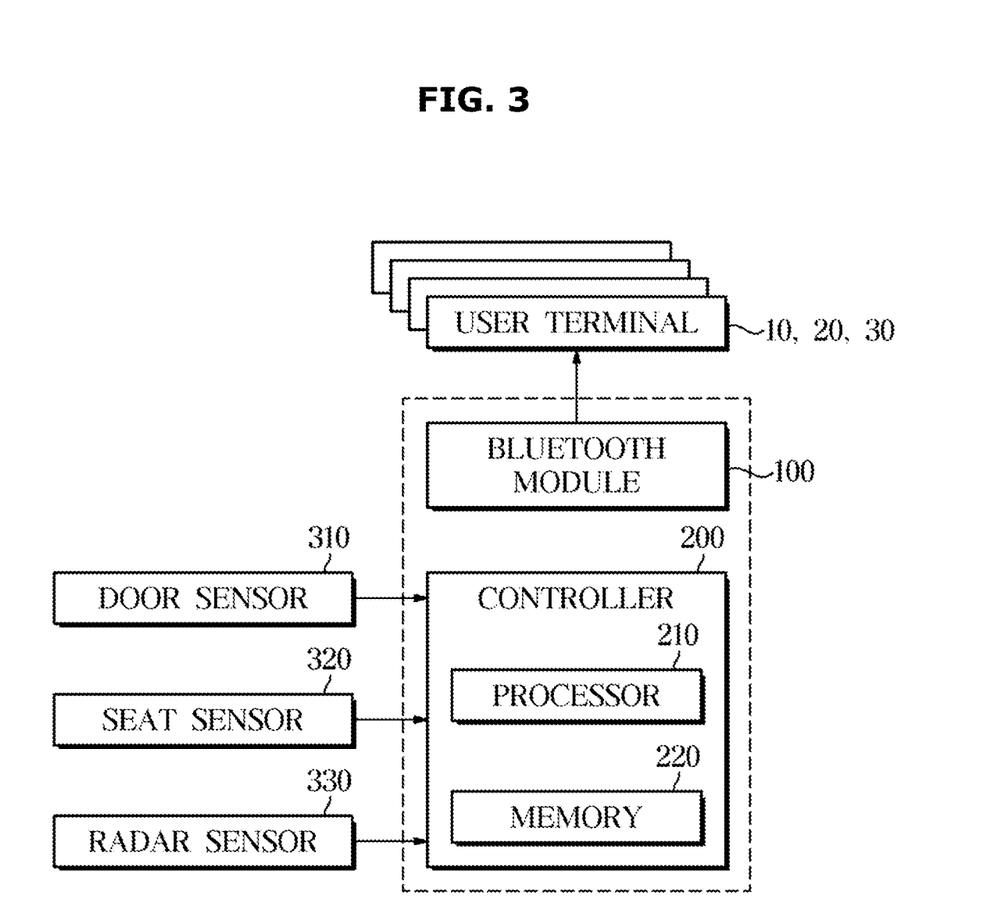
FIG. 3 is a control block diagram illustrating a vehicle according to an exemplary embodiment.

FIGS. 1 and 2 illustrate a connection relationship among user terminals and Bluetooth® modules in a vehicle according to an exemplary embodiment. FIG. 3 is a control block diagram illustrating a vehicle according to an exemplary embodiment.

FIGS. 1 and 2 illustrate a configuration and operation of a system where a vehicle 1 according to an exemplary embodiment is connected to a plurality of user terminals 10, 20, 30 and 40. However, the configuration and operation are only a preferred embodiment for achieving the objective of the disclosure, and a portion of constituent components may be added or omitted as required. As shown in FIG. 1, the system in which a method according to the embodiment is performed comprises the plurality of user terminals 10, 20, 30 and 40 and a controller 200 provided in the vehicle 1. A "user" described below refers to every occupant in the vehicle 1 in addition to a driver, and refers to anyone who possesses an electronic device capable of performing Bluetooth® communication inside the vehicle 1.

For example, the plurality of user terminals 10, 20, 30 and 40 are a computing device such as a smartphone, a tablet, a laptop, and the like, and may comprise an electronic device performing data communication. Meanwhile, referring to FIG. 1, it may be confirmed that the plurality of user terminals 10, 20, 30 and 40 are illustrated as a smartphone as an example.

The vehicle 1 is provided with a plurality of seats 510, 520, 530 and 540 in which a driver and occupants other than the driver may be seated.

In general, a Bluetooth® transceiver is provided in a vehicle to perform pairing with a driver's user terminal and a vehicle control may be performed through the driver's user terminal. In this instance, a single Bluetooth® transceiver may be provided for each vehicle, and perform one-to-one pairing with a user terminal.

According to an exemplary embodiment, a plurality of Bluetooth® modules 110, 120, 130 and 140 are provided in the vehicle 1, and thus the user terminals of the driver and occupants inside the vehicle 1 may be paired at the same time. In this instance, each of the plurality of Bluetooth® modules 110, 120, 130 and 140 may be provided at a position corresponding to each of the plurality of seats 510, 520, 530 and 540. For example, the first Bluetooth® module 110 is provided close to the first seat 510 which is a driver's seat, the second Bluetooth® module 120 is provided close to the second seat 520 which is a front passenger seat, the third Bluetooth® module 130 is provided close to the third seat 530 which is a rear left seat, and the fourth Bluetooth® module 140 is provided close to the fourth seat 540 which is a rear right seat.

Bluetooth® identification information different from each other is assigned to each of the plurality of Bluetooth® modules 110, 120, 130 and 140, and terminal identification information different from each other is assigned to each of the plurality of user terminals 10, 20, 30 and 40.

Accordingly, the controller 200 may be configured to identify a seat position of a user terminal generating a control signal based on the Bluetooth® identification information and the terminal identification information. Also, the controller 200 may be configured to perform Bluetooth® pairing at a seat position of a user carrying a user terminal according to a strength of a Bluetooth® signal generated in the user terminal. An algorithm related thereto will be described in detail with reference to FIGS. 4 to 8.

The controller 200 is provided in the vehicle 1, and allows the plurality of Bluetooth® modules 110, 120, 130 and 140, capable of performing bidirectional communication with the plurality of user terminals 10, 20, 30 and 40, to complete pairing. After pairing, the controller 200 may be configured to generate a control command based on a signal generated in the paired user terminal.

Referring to FIG. 3, according to the embodiment, the vehicle 1 may be configured to perform communication with the plurality of user terminals 10, 20 and 30, and comprise a Bluetooth® module 100, the controller 200, a door sensor 310, a seat sensor 320, a radar sensor 330, and the like.

The Bluetooth® module 100 may be configured to perform Bluetooth® connection with the user terminal 10. The Bluetooth® module 100 may be configured to perform a series of operations for transceiving data with the user terminal 10, and transmit data received from the user terminal 10 to the controller 200.

The Bluetooth® module 100 may be configured to attempt pairing with a plurality of user terminals to receive terminal identification information, or maintain a connection with the plurality of user terminals by approving a pairing request attempted by the plurality of user terminals.

The controller 200 may be configured to generate various control commands based on the data received by the Bluetooth® module 100 through the user terminal.

The controller 200 may comprise at least one memory 220 in which a program for performing the above-described operations and operations to be described below is stored, and at least one processor 210 for executing the stored program. When a plurality of memories 220 and a plurality of processors 210 are included, the plurality of memories 220 and the plurality of processors 210 may be integrated into one chip or may be physically separated.

The controller 200 may be configured to identify a position of the user terminal 10 among the plurality of seats 510, 520, 530 and 540 based on the Bluetooth® signal received from the Bluetooth® module 100. When the seat position of the user terminal 10 is identified, the controller 200 may be configured to perform pairing with the Bluetooth® module 100 closest to the user terminal 10.

Meanwhile, the controller 200 may be configured to receive signals from the door sensor 310, the seat sensor 320, and the radar sensor 330.

The door sensor 310 may be configured to detect an open state and a closed state of a door (not shown) hinged to a vehicle body and transmit to the controller 200. Specifically, when the door is changed from the open state to the closed state, the door sensor 310 may be configured to generate a door signal, and transmit the door signal to the controller 200 so that the controller 200 may be configured to determine which seat an occupant is located.

The seat sensor 320 refers to a piezoelectric sensor embedded in a seat and may be provided for each of the plurality of seats 510, 520, 530 and 540. In this instance, the seat sensor 320 may be configured to transmit seat signals different from each other to the controller 200 so that the controller 200 may be configured to determine which seat an occupant is located.

The radar sensor 330 is provided inside the vehicle 1 to perform a rear occupancy alert (ROA) function. The radar sensor 330 monitors biometric information of an occupant, and generates a rear seat signal. The radar sensor 330 generates the rear seat signal and transmits to the controller 200 so that the controller 200 may be configured to determine which seat an occupant is located.

Figure 4:
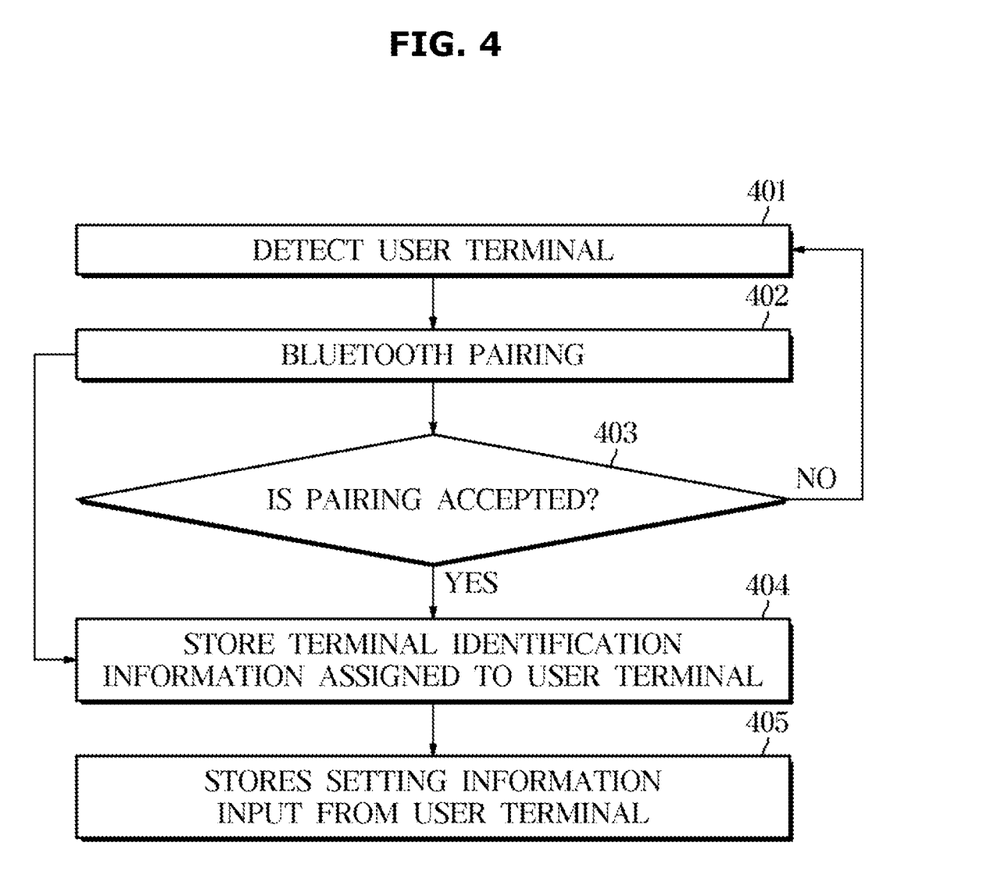
FIG. 4 is a flowchart illustrating user terminal registration operations in a vehicle according to an exemplary embodiment.

FIG. 4 is a flowchart illustrating user terminal registration operations in a vehicle according to an exemplary embodiment. Hereinafter, a user terminal may be the plurality of user terminals 10, 20 and 30 or the single user terminal 10, and for convenience of description, a plurality of user terminals are collectively referred to as the user terminal 10.

The vehicle 1 detects the user terminal 10 through the Bluetooth® module 100 (401), and attempts pairing with the user terminal 10 (402).

The vehicle 1 may be configured to automatically complete pairing with the user terminal 10, and also complete pairing by receiving an acceptance command from a user (403).

The controller 200 may be configured to store terminal identification information assigned to the user terminal 10 (404). The terminal identification information corresponds to data for distinguishing user terminals, when several user terminals are connected at the same time or at different times.

After pairing with the user terminal 10, the controller 200 stores setting information input from the user terminal (405). An application for remotely controlling various functions of the vehicle 1 may be installed in the user terminal 10. A user may be configured to control a variety of convenience devices of the vehicle 1 through the user terminal in which the application is installed. For example, by running the application, the user may be configured to control a height or angle of seat, a wind strength or temperature of air conditioner, a window opening degree, a wind strength of ventilated seat fan, a temperature of seat heating wire, a volume of each speaker, and the like, through a specific interface screen.

The above-described functions may have different settings for each seat position in the vehicle 1. For example, a setting of a memory seat in a driver's seat and a setting of a memory seat in a passenger seat may have different setting values according to settings input by users. Also, a temperature of the seat heating wire for each of the driver's seat, passenger seat and rear seat may be set differently according to input from each user. The controller 200 controls the memory 220 to store the terminal identification information and setting input information input from the user.

The operations of performing Bluetooth® pairing with the user terminal 10 by the vehicle 1 have been described. Hereinafter, when pre-stored terminal identification information is recognized after setting information is stored in the vehicle 1 as shown in FIG. 4, operations of automatically controlling various functions for each seat are described.

Figure 5:
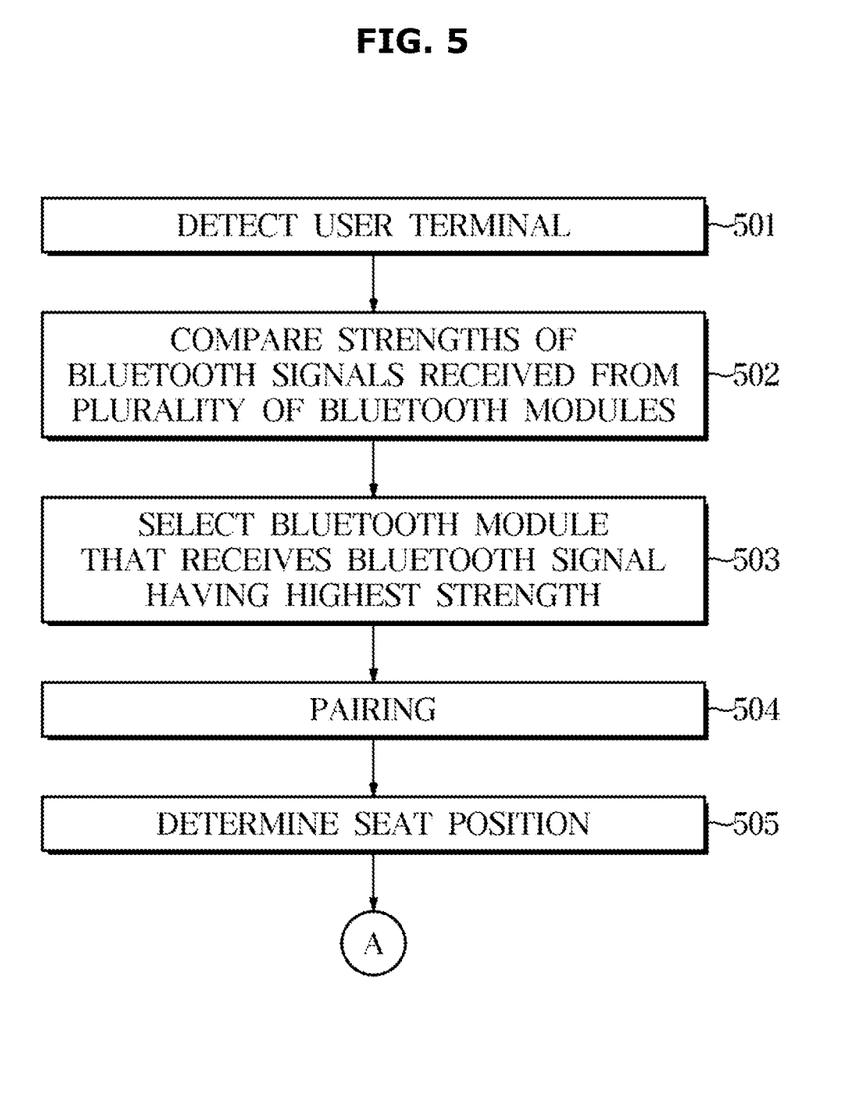
FIG. 5 is a flowchart illustrating pairing operations when a single user terminal is detected in a vehicle according to an exemplary embodiment.

FIG. 5 is a flowchart illustrating pairing operations when a single user terminal is detected in a vehicle according to an exemplary embodiment.

The controller 200 detects the user terminal 10 (501). The controller 200 receives a Bluetooth® signal generated in the user terminal 10 from the Bluetooth® module 100.

The controller 200 compares strengths of the Bluetooth® signals received from a plurality of Bluetooth® modules (502). As described with reference to FIG. 2, each of the plurality of Bluetooth® modules 110, 120, 130 and 140 is provided at a position corresponding to each of the plurality of seats 510, 520, 530 and 540. The controller 200 receives the Bluetooth® signals generated in the same user terminal 10 from the Bluetooth® modules 110, 120, 130 and 140. In this instance, terminal identification information obtained by the controller 200 from the plurality of Bluetooth® modules 110, 120, 130 and 140 is the same, but distances between the user terminal 10 and each of the plurality of Bluetooth® modules are different, and thus the strengths of the Bluetooth® signals are different from each other.

According to an exemplary embodiment, the controller 200 may be configured to identify a seat position of the user terminal 10 based on the strengths of the Bluetooth® signals. A position of the user terminal 10 indicates a position of an occupant.

The controller 200 selects the Bluetooth® module 100 that receives a Bluetooth® signal having a highest strength (503), and performs pairing between the user terminal 10 and the Bluetooth® module 100 that receives the Bluetooth® signal having the highest strength (504). For instance, when only a driver is in the vehicle 1, pairing between the user terminal 10 and the Bluetooth® module 100 located in a driver's seat side is completed, without pairing with the other Bluetooth® modules 100.

When pairing is completed, the controller 200 determines the seat position based on the Bluetooth® module 100 where pairing with the user terminal 10 is completed (505). For example, when pairing between the user terminal 10 and the first Bluetooth® module 110 (refer to FIGS. 1 and 2) provided in the driver's seat is completed, the controller 200 may be configured to determine that a user is located in the driver's seat.

In FIG. 5, the operations for determining the position of the occupant possessing the user terminal 10 when the single user terminal 10 is detected inside the vehicle 1 have been described. Hereinafter, when two or more occupants exist in the vehicle 1, operations of pairing and seat position determination for each occupant are described.

Figure 6:
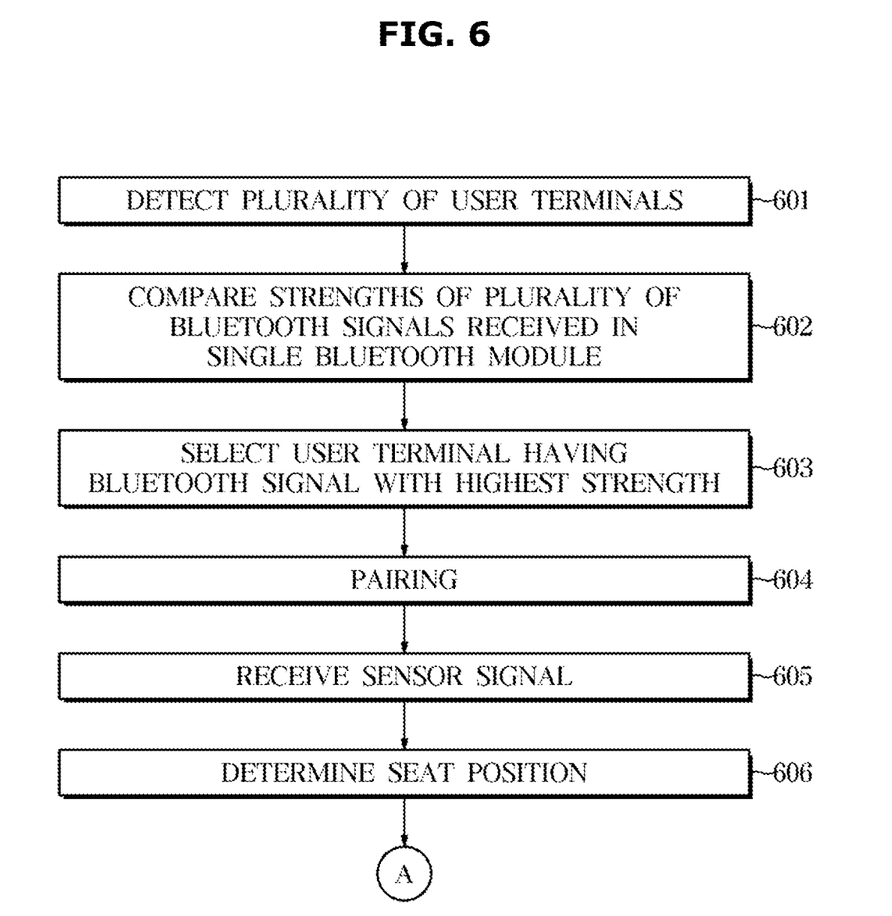
FIG. 6 is a flowchart illustrating pairing operations when a plurality of user terminals are detected in a vehicle according to an exemplary embodiment.
Figure 7:
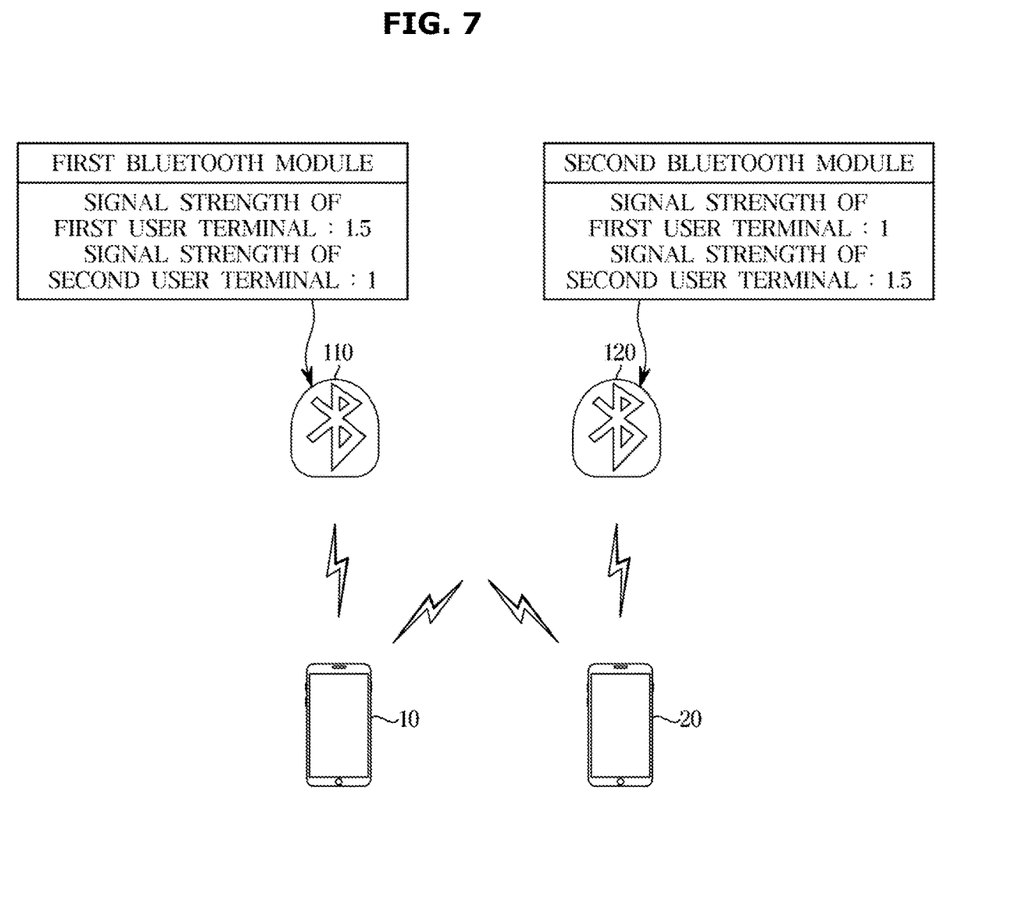
FIG. 7 is a diagram for illustrating in greater detail FIG. 6.

FIG. 6 is a flowchart illustrating pairing operations when a plurality of user terminals are detected in a vehicle according to an exemplary embodiment. FIG. 7 is a diagram for illustrating in greater detail FIG. 6.

The controller 200 detects the plurality of user terminals 10, 20 and 30 (601). The controller 200 receives Bluetooth® signals, generated in the plurality of user terminals 10, 20, 30 and 40, from the plurality of Bluetooth® modules 110, 120, 130 and 140. By receiving the Bluetooth® signals through the Bluetooth® module 100 and identifying the number of user terminals 10, the controller 200 may be configured to identify the number of occupants inside the vehicle 1. Hereinafter, for convenience of description, a description is made based on the first user terminal 10, the second user terminal 20, the first Bluetooth® module 110 and the second Bluetooth® module 120, and the embodiment is also applicable even when several user terminals exist.

The controller 200 compares strengths of the plurality of Bluetooth® signals received in a single Bluetooth® module (602). For example, the first Bluetooth® module 110 receives the Bluetooth® signal generated in the first user terminal 10 and the Bluetooth® signal generated in the second user terminal 20, and the controller 200 compares strengths of the two Bluetooth® signals. Likewise, the second Bluetooth® module 120 receives the Bluetooth® signal generated in the first user terminal 10 and the Bluetooth® signal generated in the second user terminal 20, and the controller 200 compares strengths of the two Bluetooth® signals. The above operation may be collectively performed by the controller 200.

The controller 200 selects a single user terminal 10 having a Bluetooth® signal with a highest strength based on a single Bluetooth® module (603). Referring to FIG. 7, the first Bluetooth® module 110 provided in the driver's seat receives a Bluetooth® signal having a signal strength of 1.5 from the first user terminal 10 and a Bluetooth® signal having a signal strength of 1 from the second user terminal 20. For reference, it is to be noted that the numerical values of signal strength referenced in FIG. 7 are a relative numerical value introduced for description, and are not a numerical value having a specific unit. Here, the controller 200 may be configured to determine that the first user terminal 10 having a relatively high signal strength is closest to the first Bluetooth® module 110 and a user using the first user terminal 10 is located in the driver's seat.

The controller 200 selects the user terminal 10 that generates the Bluetooth® signal having the highest strength based on any one of the plurality of Bluetooth® modules (603) and performs pairing (604).

Accordingly, the controller 200 performs pairing with the user terminal that generates the highest signal strength from among the plurality of user terminals, based on any one Bluetooth® module. That is, the controller 200 may be configured to determine a position of the user based on the Bluetooth® signal strength. In addition, the controller 200 may be configured to determine the position of the user by additionally referring to signals of various sensors provided in the vehicle 1.

The controller 200 receives a sensor signal (605). In this instance, a sensor comprises the door sensor 310, the seat sensor 320, the radar sensor 330 (refer to FIG. 3). The controller 200 may be configured to determine the position of the user terminal 10, i.e., the position of the user, based on the signals received from the various sensors in addition to the Bluetooth® signal strength.

The vehicle 1 according to an exemplary embodiment is provided with the door sensor 310 that detects a closing of a door and generates a door signal. The controller 200 may be configured to determine a seat position of a paired user terminal based on the door signal generated in the door sensor 310. For example, when the door signal is generated at the driver's seat side within a predetermined period of time, the controller 200 may be configured to determine that the user terminal 10 is located in the driver's seat. Also, according to an exemplary embodiment, the controller 200 may be configured to perform pairing based on the above-described Bluetooth® signal strength and detection of the door signal. The position of the user may be accurately determined by performing pairing only when the two conditions are satisfied.

The vehicle 1 according to an exemplary embodiment comprises the seat sensor 320 which is provided in each of the plurality of seats, detects a pressure by a driver or occupant and generates a seat signal. The controller 200 may be configured to determine a seat position of a paired user terminal based on the seat signal generated in the seat sensor 310. For example, when a seat signal is generated from the seat sensor 320 embedded in the driver's seat, the controller 200 may be configured to determine that the user terminal 10 is located in the driver's seat. Also, according to an exemplary embodiment, the controller 200 may be configured to perform pairing based on the above-described Bluetooth® signal strength and detection of the seat signal. The position of the user may be accurately determined by performing pairing only when the two conditions are satisfied.

The vehicle 1 according to an exemplary embodiment is equipped with a rear occupant alert (ROA) system which is provided in a rear seat among the plurality of seats, detects an occupant sitting in the rear seat and generates a rear seat signal. In this instance, to implement the ROA system, the vehicle 1 is provided with the radar sensor 330. The radar sensor 330 provided in the rear seat detects a rear occupant and generates the rear seat signal. The controller 200 may be configured to determine a seat position of a paired user terminal based on the rear seat signal. Also, according to an exemplary embodiment, the controller 200 may be configured to perform pairing based on the above-described Bluetooth® signal strength and detection of the rear seat signal. The position of the user may be accurately determined by performing pairing only when the two conditions are satisfied.

Further, according to an exemplary embodiment, a change in Bluetooth® signal strength is detected by any one of the plurality of Bluetooth® modules 110, 120, 130 and 140, and the controller 200 may be configured to identify a seat position change of the user based on the change in signal strength. For example, when the first Bluetooth® module 110 detects that a Bluetooth® signal strength of the first user terminal 10 is decreased from 1.5 to 1.0 and the second Bluetooth® module 120 detects that a Bluetooth® signal strength of the first user terminal 10 is increased from 1.0 to 1.5, the controller 200 may be configured to determine that a user with the first user terminal 10 moves to the second seat 520, end pairing between the first Bluetooth® module 110 and the first user terminal 10 and start pairing between the second Bluetooth® module 120 and the first user terminal 10.

In addition, according to an exemplary embodiment, the controller 200 may be configured to detect a change in seat signal and determine a movement of seat position of the user terminal 10. For instance, when an occupant moves to a rear right seat from a rear left seat, the controller 200 receives a seat signal from another seat sensor. Based on the above, the controller 200 may be configured to determine that a user of a paired user terminal has moved, and perform pairing with the Bluetooth® module 100 located in the changed position. The embodiment may also be implemented based on the rear seat signal generated from the radar sensor 330 in addition to the seat signal. The controller 200 may be configured to detect a change in rear seat signal, determine a movement of seat position of the paired user terminal 10, and perform pairing with the Bluetooth® module 100 located in the changed position.

That is, the controller 200 determines the seat position of the user terminal 10 based on at least one of the sensor signals or the Bluetooth® signals (606).

According to an exemplary embodiment, when pairing between one of the plurality of Bluetooth® modules and one of the plurality of user terminals is completed, the controller 200 may be configured to determine the seat position of the paired user terminal based on Bluetooth® identification information and generate a control command according to setting information stored in the paired user terminal. In this instance, the control command corresponds to a control signal for changing or maintaining settings of various devices provided in the vehicle 1 (e.g., a memory seat, air conditioner, window, ventilated seat, seat heating wire, speaker). Control operations after pairing are described with reference to FIG. 8.

Figure 8:
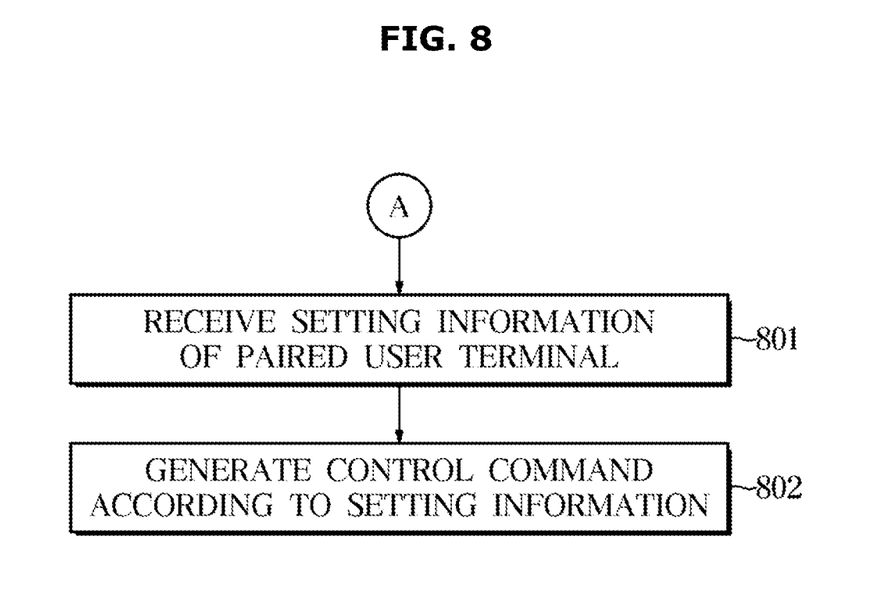
FIG. 8 is a flowchart illustrating operations after pairing in a vehicle according to an exemplary embodiment.

FIG. 8 is a flowchart illustrating operations after pairing in a vehicle according to an exemplary embodiment.

Prior to the description of the embodiment, when pairing with the user terminal 10 is performed for the first time, the vehicle 1 stores a setting input from the user terminal 10, and then controls various devices according to the stored setting in a seat where the user terminal 10 is located. According to an exemplary embodiment, the user terminal 10 may be configured to receive a setting input for at least one of a memory seat, a seat heating wire, a ventilated seat, an air conditioner or a window, and the controller 200 may be configured to control the memory 220 to store the setting input for each terminal identification information.

The controller 200 receives setting information of the paired user terminal 10 (801). In this instance, the controller 200 may be configured to identify a seat position of the user terminal 10 based on Bluetooth® identification information of the Bluetooth® module 100 paired with the user terminal 10.

The controller 200 generates a control command according to the setting information (802). In this instance, the control command corresponds to a command for controlling various devices corresponding to the identified seat position. For example, the generated control command corresponds to a control signal for controlling only a memory seat of a driver's seat or only a heating wire of one seat of rear seat.

According to an exemplary embodiment, the controller 200 may be configured to determine the seat position of the paired user terminal 10, and control a memory seat of the determined seat position according to the setting input.

According to an exemplary embodiment, the controller 200 may be configured to determine the seat position of the paired user terminal 10, and control a temperature of seat heating wire of the determined seat position according to the setting input.

According to an exemplary embodiment, the controller 200 may be configured to determine the seat position of the paired user terminal 10, and control a temperature of air conditioner located close to the determined seat position according to the setting input.

As is apparent from the above, according to the embodiments of the disclosure, the vehicle and the control method thereof can automatically provide a convenience function tailored to each occupant in the vehicle using a profile of each of the occupants including a driver.

Embodiments can thus be implemented in the form of a recording medium storing computer-executable instructions that are executable by a processor. The instructions may be stored in the form of a program code, and when executed by a processor, the instructions may be configured to generate a program module to perform operations of the disclosed embodiments. The recording medium may be implemented non-transitory as a computer-readable recording medium.

The computer-readable code can be recorded on a medium or transmitted through the Internet. The medium may comprise read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:
1. A vehicle, comprising:
 a plurality of seats;
 a plurality of wireless communication modules to which wireless communication module identification information, different from each other, is assigned, and configured to perform pairing with a plurality of user terminals, wherein each of the plurality of wireless communication modules corresponds to each of the plurality of seats;
 a memory configured to store:
  terminal identification information assigned to each of the plurality of user terminals; and
  the wireless communication module identification information assigned to each of the plurality of wireless communication modules;
 a processor configured to be connected to the plurality of wireless communication modules and the memory,
 wherein, when pairing is completed between one of the plurality of wireless communication modules and one of the plurality of user terminals, the processor is configured to:
  determine a seat position of a paired user terminal based on the wireless communication module identification information; and
  generate a control command according to setting information stored in the paired user terminal; and
 a seat sensor provided in each of the plurality of seats configured to:
  detect a pressure by a driver or an occupant; and
  generate a seat signal according to the detected pressure;
  wherein the processor is configured to:
   determine the seat position of the paired user terminal based further on the seat signal;
   detect a change wireless communication signal strength detected by one of the plurality of wireless communication modules; and
   determine a movement of the seat position of the paired user terminal.

2. The vehicle of claim 1, wherein:
a first wireless communication module, which is the one of the plurality of wireless communication modules, is configured to receive a plurality of wireless communication signals from the plurality of user terminals, and
the processor is configured to control the first wireless communication module to pair with a user terminal with a highest strength of a wireless communication signal among the plurality of user terminals.

3. The vehicle of claim 2, wherein the processor is configured to identify the seat position of the user terminal based on a strength of the wireless communication signal.

4. The vehicle of claim 1, wherein:
the plurality of user terminals are configured to receive a setting input for at least one of a memory seat, a seat heating wire, a ventilated seat, an air conditioner or a window, and
the processor is configured to control the memory to store the setting input for each terminal identification information.

5. The vehicle of claim 4, wherein the processor is configured to:
determine the seat position of the paired user terminal; and
control the memory seat located in the determined seat position according to the setting input.

6. The vehicle of claim 4, wherein the processor is configured to:
determine the seat position of the paired user terminal; and
control a temperature of the seat heating wire located in the determined seat position according to the setting input.

7. The vehicle of claim 4, wherein the processor is configured to:
determine the seat position of the paired user terminal; and
control a temperature of the air conditioner located around the determined seat position according to the setting input.

8. The vehicle of claim 1, further comprising a door sensor configured to:
detect a closing of a door of the vehicle; and
generate a door signal,
wherein the processor is configured to determine the seat position of the paired user terminal based further on the door signal.

9. The vehicle of claim 1, wherein the processor is configured to:
detect a change of the seat signal; and
determine a movement of the seat position of the paired user terminal.

10. The vehicle of claim 1, further comprising:
a rear occupant alert (ROA) system configured to:
detect an occupant located in a rear seat; and
generate a rear seat signal according to a presence of the occupant located in the rear seat,
wherein the processor is configured to determine the seat position of the paired user terminal based further on the rear seat signal.

11. A control method of a vehicle comprising a plurality of wireless communication modules configured to perform pairing with a plurality of user terminals, the control method comprising:
performing pairing between one of the plurality of wireless communication modules and one of the plurality of user terminals;
determining a seat position of a paired user terminal based on wireless communication identification information; and
generating a control command according to setting information stored in the paired user terminal;
wherein the control method further comprises:
detecting, by a sensor provided in each of the plurality of seats, a pressure by a driver or occupant;
generating, by the seat sensor, a seat signal according to the detected pressure,
determining the seat position of the paired user terminal based further on the seat signal;
detecting a change in wireless communication signal strength detected by one of the plurality of wireless communication modules; and
determining a movement of the seat position of the paired user terminal.

12. The control method of claim 11, wherein the performing pairing comprises controlling one of the plurality of wireless communication modules to pair with a user terminal with a highest strength of a wireless communication signal among the plurality of user terminals.

13. The control method of claim 12, further comprising identifying a seat position of the user terminal based on a strength of the Blue wireless communication signal.

14. The control method of claim 11, further comprising:
receiving a setting input for at least one of a memory seat, a seat heating wire, a ventilated seat, an air conditioner or a window, through the plurality of user terminals; and
controlling a memory to store the setting input for each terminal identification information.

15. The control method of claim 14, further comprising determining the seat position of the paired user terminal, and controlling the memory seat located in the determined seat position according to the setting input.

16. The control method of claim 14, further comprising determining the seat position of the paired user terminal, and controlling a temperature of the seat heating wire located in the determined seat position according to the setting input.

17. The control method of claim 14, further comprising determining the seat position of the paired user terminal, and controlling a temperature of the air conditioner located around the determined seat position according to the setting input.

18. The control method of claim 11, wherein:
the vehicle further comprises a door sensor configured to:
detect a closing of a door of the vehicle; and
generate a door signal, and
the control method further comprises determining the seat position of the paired user terminal based further on the door signal.

* * * * *